No. 873,533. PATENTED DEC. 10, 1907.
B. F. FOWLER.
TRAVELING ROCKING HORSE.
APPLICATION FILED OCT. 16, 1906.
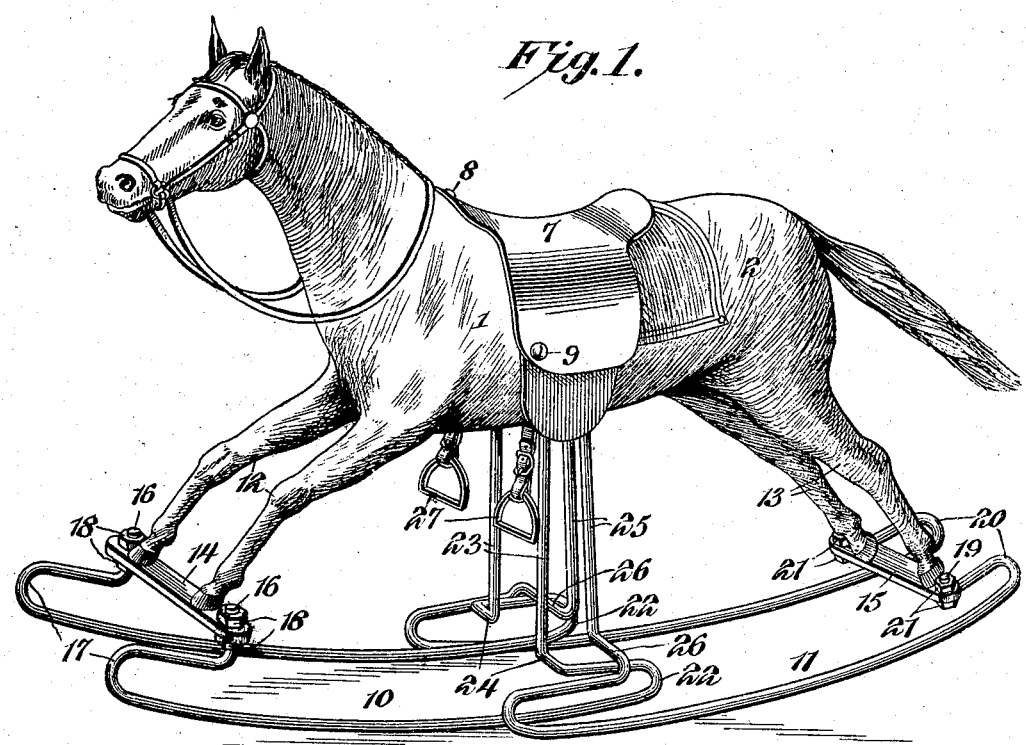
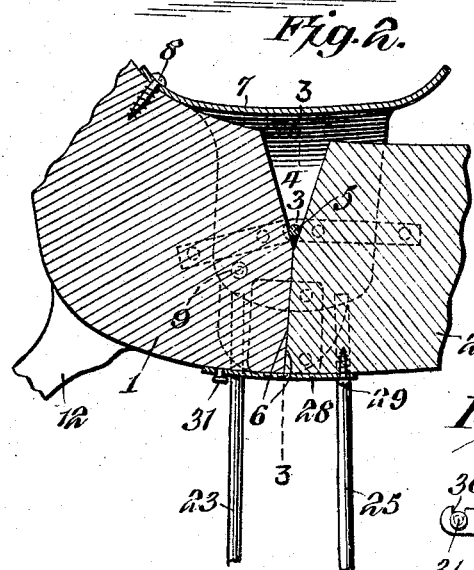
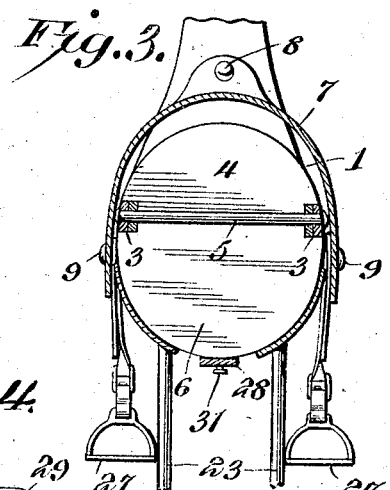
Witnesses
Howard D. Orr.
J. F. Riley
Inventor,
Benjamin F. Fowler,
By E. G. Siggers
Attorney

UNITED STATES PATENT OFFICE.

BENJAMIN F. FOWLER, OF MINNEAPOLIS, MINNESOTA, ASSIGNOR OF ONE-HALF TO LUKE W. NORTHFIELD, OF MINNEAPOLIS, MINNESOTA.

TRAVELING ROCKING-HORSE.

No. 873,533.  Specification of Letters Patent.  Patented Dec. 10, 1907.

Application filed October 16, 1906. Serial No. 339,240.

*To all whom it may concern:*

Be it known that I, BENJAMIN F. FOWLER, a citizen of the United States, residing at Minneapolis, in the county of Hennepin and State of Minnesota, have invented a new and useful Traveling Rocking-Horse, of which the following is a specification.

The invention relates to improvements in traveling rocking horses.

The object of the present invention is to simplify and improve the construction of traveling rocking horses, and to increase the strength and durability of the same and lessen the cost of construction.

A further object of the invention is to provide a traveling rocking horse, having means for locking it to prevent such traveling movement, and thereby enable the rocking horse to rock backward and forward similar to a non-traveling rocking horse.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a traveling rocking horse, constructed in accordance with this invention. Fig. 2 is an enlarged sectional view of the central portion of the body rockers, illustrating the manner of hinging the front and rear sections of the same. Fig. 3 is a sectional view taken substantially on the line 3—3 of Fig. 2. Fig. 4 is a detail view of the catch for locking the hinged sections of the body of the horse rigid with each other to prevent the rocking horse from traveling.

Like numerals of reference designate corresponding parts in all the figures of the drawing.

1 and 2 designate front and rear sections of the body of a traveling rocking horse. The body of the traveling rocking horse is divided centrally transversely of the horse, and the sections are connected together by hinges 3, located approximately at the center of the sides of the body and at the bottom of an upper V-shaped recess 4, which is formed by beveling or cutting away the front and rear sections above the pintle 5 of the hinges to permit the sections to have relative, pivotal or oscillatory movement on the pintle 5 of the hinges 3. The pintle rod which is located at the bottom of the V-shaped recess preferably extends entirely across the body of the rocking horse, and the hinges are composed of leaves or members, secured to the sections 1 and 2 in suitable recesses thereof and having rounded ends or eyes, which are perforated to receive the pintle rod 5. The leaves or sections of the hinges consist of longitudinal bars, extending forwardly and rearwardly from the recess 4 and having their proximate ends overlapped and provided with the said eyes. The sections are provided below the pintle rod with abutting faces 6, which limit the swinging or pivotal movement of the sections in one direction.

The rocking horse is provided with a seat or saddle 7, constructed of stout sheet metal, or any other suitable material and composed of a top portion and depending sides, and rigidly secured at the top and at the sides to the front section 1 of the body by means of suitable fastening devices 8 and 9. The saddle spans the V-shaped recess 4 and conceals the same. When the horse rocks, the weight of the rider on the saddle causes the sections 1 and 2 to swing on the pintle or pivot 5, and move front and rear rockers 10 and 11 longitudinally, the rockers being successively advanced, whereby the rocking horse is caused to travel forwardly. The front legs 12 incline downwardly and forwardly, and the rear legs 13 are extended downwardly and rearwardly at an inclination, the front and rear legs being suitably secured to front and rear cross bars or pieces 14 and 15.

The front and rear rockers are preferably constructed of rod metal and are provided with inner and outer terminal loops, formed by bending the rods upwardly and inwardly as shown. The front terminals 16 of the rods of the front rockers are bent forward at the upper sides or top portions of the outer or front loops 17, and are passed through suitable perforations of the front cross piece 14 at points beyond the front legs 12, and the said terminals 16 are threaded for the reception of upper and lower nuts 18, arranged in pairs and engaging the upper and lower faces of the front cross piece 14. The rear terminals 19 of the rods of the rear rockers are also bent upward at the top portions of the rear terminal loops 20, and pass through perforations of the rear cross piece 15, being threaded and provided with upper and lower nuts 21 for engaging the said rear cross piece 15.

The front rockers are provided at the rear or inner loops 22 with integral arms 23, arranged vertically and having lower laterally bent portions 24, which connect the arms 23 with the loops 22. The upper ends of the arms 23 are embedded in the body of the horse, as clearly illustrated in dotted lines in Fig. 2 of the drawing.

The inner ends of the front and rear rockers overlap or extend past each other, and the front ends of the rear rockers are constructed in substantially the same manner as the rear ends of the front rockers, being provided with integral vertical arms 25. The upper ends of the arms 25 are embedded in the bottom of the rear section of the body of the horse, and the lower ends of the arms are provided with laterally bent portions 26, which extend across the inner or rear loops 22 of the front rockers, and are connected with the front or inner loops of the rear rockers.

The rocking horse is provided with suitable stirrups 27, which are secured to the front section by the fastening device 9, and when the horse rocks forward, the weight of the rider is supported by the front section, and the rear section swings forwardly by gravity, thereby advancing the rear rockers 11. When the horse rocks rearwardly, the weight of the rider upon the saddle, which extends rearwardly from the front section, is supported by the rear section and swings the front section forwardly, thereby advancing the front rockers. This operation causes the rocking horse to travel forwardly when it is operated.

Should it be desired to have the rocking horse operate as a non-traveling horse, the sections 1 and 2 may be locked rigid with each other by means of a bottom locking device 28, consisting of a bar or piece, pivoted at one end by a screw 29, or other suitable fastening device to the bottom of the rear section and provided at its other end with a notch or recess 30. The notch or recess 30 is located at the free end of the locking device, which is adapted to engage a head projection 31 of the front section 1 of the body. The head projection 31 depends from the bottom of the front section, and when the locking device is in engagement with the same, the front and rear sections are locked rigid with each other and the locking or hobby horse will operate as a non-traveling rocking horse.

It will be understood that the invention, by the term "rocking" or "hobby" horse, is not limited to the configuration of a horse, as the form of any other body may be adopted.

Having thus fully described my invention, what I claim as new and desire to secure by Letters Patent, is:—

1. A device of the class described comprising a body composed of sections hinged together and provided with front and rear legs, front and rear rockers, each constructed of a single piece of metal and provided with outer and inner loops arranged in vertical planes, the outer loops being connected with the front and rear legs and extending beyond the same, and the inner loops being provided with integral rods connecting the rockers with the inner portions of the sections.

2. A device of the class described comprising a body having hinged front and rear sections provided with front and rear legs, and front and rear rockers having outer and inner loops arranged in vertical planes, the outer loops being connected with and extending beyond the front and rear legs, the inner loops of the rockers being overlapped, and the said rockers being provided with integral arms connected at their upper ends to the inner portions of the sections and having laterally bent portions at their lower ends connected with the inner loops.

3. A device of the class described comprising a body provided with front and rear legs, and front and rear rockers, each constructed of a single piece of metal and provided with outer and inner loops arranged in vertical planes, the outer loops being connected with and extending beyond the front and rear legs, and the inner loops being provided with integral rods connecting the rockers with the body.

4. A device of the class described comprising a body having front and rear legs, and front and rear rockers consisting of rods provided at their outer ends with terminal loops arranged in vertical planes and connected to and extending beyond the front and rear legs, said rockers being provided at their inner ends with overlapping loops and having integral arms connected at their upper ends to the body and provided at their lower ends with laterally bent portions connected with the inner loops.

5. A device of the class described comprising a body composed of front and rear sections having their contiguous ends cut away from the top of the body to a point above the bottom thereof to form oppositely inclined faces and to provide an upper recess, a hinge connecting the sections and having its pintle located at the bottom of the recess, whereby the sections have a relative pivotal or oscillatory movement, a locking device arranged at the bottom of the body at a point below the recess for holding the sections rigid with each other, and rockers connected with the body.

In testimony, that I claim the foregoing as my own, I have hereto affixed my signature in the presence of two witnesses.

BENJAMIN F. FOWLER.

Witnesses:
PETER M. SCHOLL,
EVA J. HALL.